(No Model.)
A. E. KENNELLY.
METHOD OF MAKING ELECTROLYTIC METERS.
No. 419,264. Patented Jan. 14, 1890.
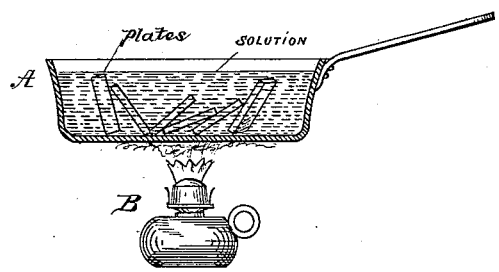
WITNESSES:
INVENTOR
Arthur E. Kennelly
BY
ATTORNEYS.

UNITED STATES PATENT OFFICE.

ARTHUR E. KENNELLY, OF ORANGE, ASSIGNOR TO THOMAS A. EDISON, OF LLEWELLYN PARK, NEW JERSEY.

METHOD OF MAKING ELECTROLYTIC METERS.

SPECIFICATION forming part of Letters Patent No. 419,264, dated January 14, 1890.

Application filed February 25, 1889. Serial No. 301,107. (No model.)

*To all whom it may concern:*

Be it known that I, ARTHUR E. KENNELLY, a subject of the Queen of Great Britain, residing at Orange, in the county of Essex and State of New Jersey, have invented a certain new and useful Improvement in Electrical Meters, of which the following is a specification.

My invention relates to that class of meters for measuring electricity in which the meter consists of an electrolytic cell composed of plates or electrodes immersed in a solution through which the current to be measured is passed, with the result that the weight of the plates is altered by the electrolytic action, so that by weighing the plates at intervals the amount of the current which has passed through the cell may be determined. In such meters difficulty has sometimes arisen from the oxidizing or tarnishing of the surfaces of the plates, whereby the resistance of the cell is altered and the weight of the plates is changed to some extent.

The object of my invention is to overcome this difficulty, and thus to maintain a constant resistance in the cell and a uniform weight for the plates, except as the same may be altered by the electrolytic action of the meter. I accomplish this preferably by heating the solution and the plates before the meter is put into use, in such manner as to drive off to as great an extent as possible such oxygen as is dissolved in the solution or is occluded at the surfaces of the plates. The oxidation above referred to, being mainly due to the presence of this dissolved or occluded oxygen, is by its removal entirely avoided or reduced to an inappreciable amount. It will be seen that the heating of the solution alone will be to a great extent effective in accomplishing the object of my invention, and so, also, will the heating of the plates alone, while the heating of both will have the fullest effect. Therefore the heating of the solution or the plates alone or the heating of both is all included in my invention.

In carrying my invention into effect I may heat the solution either before or after it is placed in the meter-bottle, and I may heat the plates before placing them in the solution, or may heat the plates and solution together in the bottle or elsewhere. The solution is preferably heated to the boiling-point and maintained at such point as long as required, and the plates should be heated to about the same temperature.

A convenient way of carrying my invention into effect is to boil the solution in a suitable vessel which also contains the plates, so that the plates are heated by boiling them in the solution. This is illustrated in the accompanying drawing, which shows the vessel in section. The drawing shows a suitable vessel A supported in any convenient manner over a lamp or other heating apparatus B. The solution and a number of plates are shown in the vessel in the process of being heated by the lamp.

As is now well known, the solution preferably used in the cell is one of sulphate of zinc, and the electrodes are zinc plates; but it is evident that my invention is equally applicable to other solutions and to electrodes of other material and to any form of electrolytic meter.

What I claim is—

1. The within-described improvement in the process of making electrolytic meters, which consists in heating the solution to expel the oxygen dissolved therein.

2. The within-described improvement in the process of making electrolytic meters, which consists in heating the electrodes to expel the oxygen occluded thereon.

3. The within-described improvement in the process of making electrolytic meters, which consists in heating both the solution and the electrodes to expel the oxygen therefrom.

This specification signed and witnessed this 19th day of February, 1889.

ARTHUR E. KENNELLY.

Witnesses:
THEO. LEHMANN,
H. W. SEELY.